(12) United States Patent
Rechberger

(10) Patent No.: US 7,099,793 B2
(45) Date of Patent: Aug. 29, 2006

(54) METHOD AND DEVICE FOR DETERMINING THE ROTOR TEMPERATURE IN A PERMANENT MAGNET-EXCITED SYNCHRONOUS MACHINE

(75) Inventor: Klaus Rechberger, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 10/479,075

(22) PCT Filed: Dec. 5, 2002

(86) PCT No.: PCT/DE02/04453

§ 371 (c)(1),
(2), (4) Date: Jul. 27, 2004

(87) PCT Pub. No.: WO03/081764

PCT Pub. Date: Oct. 2, 2003

(65) Prior Publication Data

US 2004/0257011 A1 Dec. 23, 2004

(30) Foreign Application Priority Data

Mar. 22, 2002 (DE) ............................... 102 12 751

(51) Int. Cl.
*G06F 19/00* (2006.01)
(52) U.S. Cl. .................................... 702/130; 702/127
(58) Field of Classification Search .............. 318/472; 388/909; 702/127, 130
See application file for complete search history.

(56) References Cited

U.S. PATENT DOCUMENTS

| | | | |
|---|---|---|---|
| 4,763,058 A | | 8/1988 | Heining et al. |
| 4,914,386 A | * | 4/1990 | Zocholl ...................... 324/772 |
| 5,920,161 A | | 7/1999 | Matsudaira et al. |
| 6,002,234 A | * | 12/1999 | Ohm et al. .................. 318/729 |
| 6,876,169 B1 | * | 4/2005 | Gallegos-Lopez et al. .. 318/701 |

FOREIGN PATENT DOCUMENTS

| | | |
|---|---|---|
| DE | 100 44 181 | 4/2002 |
| EP | 0 462 503 | 12/1991 |
| JP | 11 069 000 | 3/1999 |

OTHER PUBLICATIONS

Yeadon, W.H.; Yeadon, A.W; "Handbook of Small Electric Motors"; McGraw-Hill; copyright 2001; pp. 7.1-7.24.*

* cited by examiner

*Primary Examiner*—Michael Nghiem
*Assistant Examiner*—Douglas N Washburn
(74) *Attorney, Agent, or Firm*—Kenyon & Kenyon LLP

(57) ABSTRACT

A method and a device for determining the rotor temperature in a permanent-magnet-excited synchronous machine are described, in which field-oriented regulation takes place. An estimator is provided which is supplied with the manipulated variables for the direct-axis current and the cross current made available by a direct-axis current controller and a cross current controller. The estimator determines an estimate for the rotor temperature using the manipulated variables mentioned and a temperature model of the synchronous machine.

10 Claims, 1 Drawing Sheet

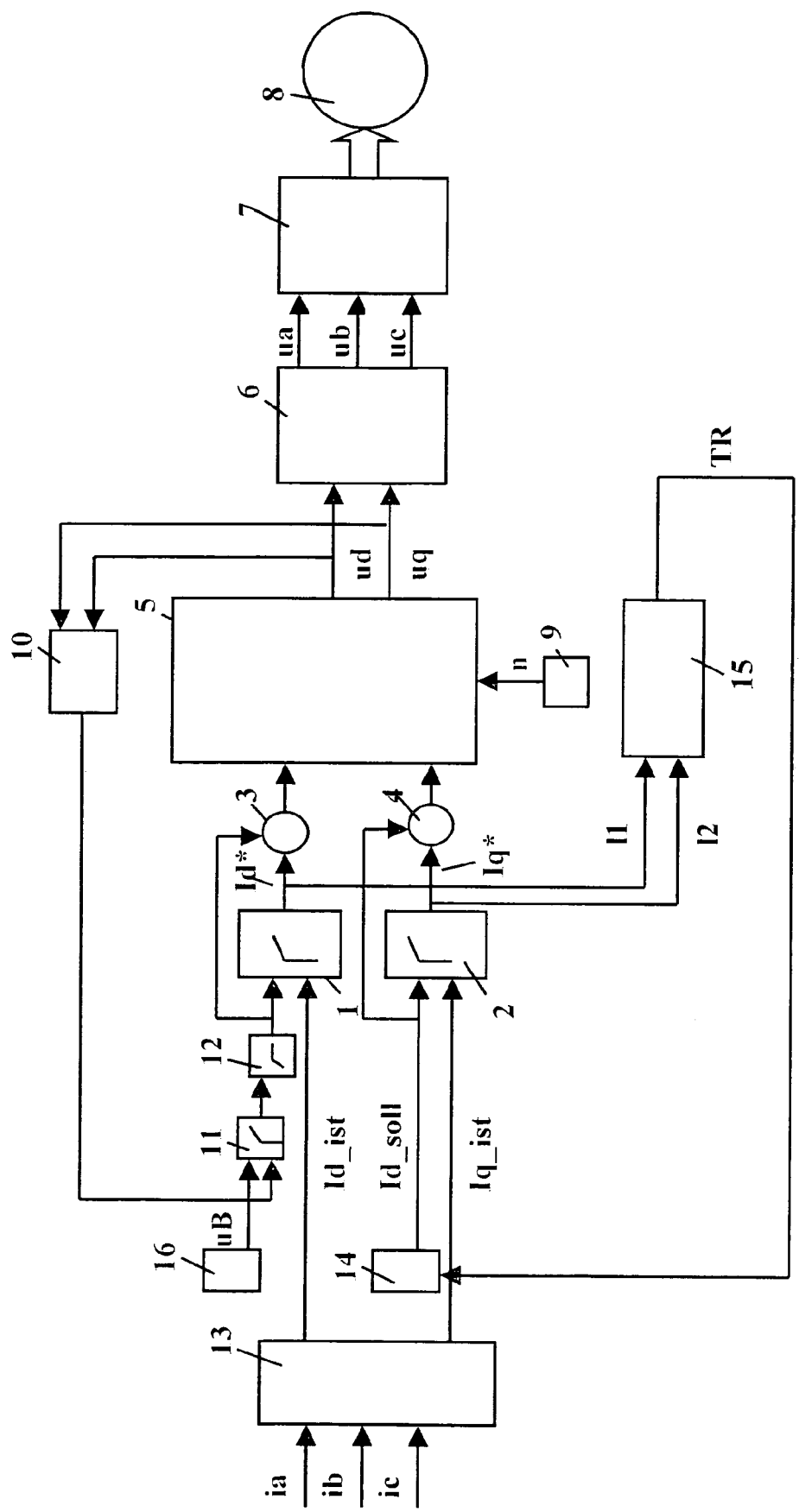

METHOD AND DEVICE FOR DETERMINING THE ROTOR TEMPERATURE IN A PERMANENT MAGNET-EXCITED SYNCHRONOUS MACHINE

BACKGROUND INFORMATION

It is known in automotive technology to install a permanent-magnet-excited synchronous machine (PM synchronous machine) as an integrated crankshaft starter-generator into the power train of a vehicle between the internal combustion engine and the transmission.

To prevent the permanent demagnetization of the permanent magnets during operation of the synchronous machine, the maximum stator field at an elevated rotor temperature must be reduced in terms of a temperature-dependent "derating" compared to the stator field at low temperatures. In particular in stop-start operation of the integrated crankshaft starter-generator it is desirable that the regulated stator current is as close as possible to a predetermined derating curve in order to ensure high starting torque and thus a short starting time of the internal combustion engine. To achieve this object, it is necessary to know the rotor temperature as accurately as possible.

One possibility for obtaining information about the rotor temperature is to measure the temperature in the rotor itself by using a thermometer. However, due to cost considerations, this possibility is rather unattractive in automotive technology.

To measure the coolant temperature and the temperature in the power converter and to draw conclusions about the rotor temperature from the measured temperature values by using an approximation algorithm is another possibility. This method is comparatively complicated and yields in addition only inaccurate results. Furthermore, this method is dependent on the respective application since the heat models are different in almost each application.

A method of regulating a synchronous three-phase machine using a converter bridge is described in German Published Patent Application No. 100 44 181. In this method, the field current flowing through the field winding is regulated in such a way that the output voltage of the synchronous three-phase machine reaches a setpoint value and the currents of the phases of the synchronous three-phase machine are regulatable in at least two control ranges. Additionally in this method, actual input variables id and iq, transformed from the three-phase system R-S-T, are supplied to a correction device from whose output variables setpoint input variables udsetpoint and uqsetpoint are determined. A multi-variable regulation of a claw-pole three-phase machine is implementable by using the controller structure proposed in German Published Patent Application No. 100 44 181.

A device having means for determining temperatures for regulating a generator is known from European Published Patent Application No. 0 462 503. The advantage of this known device lies in the fact that, in the event of high power demand, the generator may be operated in an overexcited range, and permanent damage to the generator, the rectifier diodes, or the voltage regulators as a result of thermal overheating is prevented due to the temperature determination which takes place by measuring the temperature in the voltage regulator itself and due to safeguards which may be appropriately applied. The safeguards include that prior to or when reaching a predetermined temperature limit, the field current is reduced. The means for determining the temperature include a microcomputer in which required characteristics are stored, to which the necessary measured variables are supplied, and in which the necessary computations are executed.

SUMMARY OF THE INVENTION

Simple thermal monitoring of the PM synchronous machine is performed in which an online determination of the rotor temperature takes place according to the present invention. In this online determination, the manipulated variables for the direct-axis current and the cross current, which are determined anyway during a field-oriented regulation of the PM synchronous machine, and a temperature pattern of the PM synchronous machine are used. In contrast to the related art, no special sensor system is needed.

Minor increases in software expenditure connected with the present invention may be compensated by using a low task frequency. The temperature model of the PM synchronous machine mentioned is established on a test stand within the scope of a one-time calibration of the model. A method and a device according to the present invention are independent from the particular application and, when an integrated crankshaft starter-generator is used, are also independent from the position of the starter-generator in the cooling circuit, because the actual variables used for determining the temperature according to the present invention are exclusively electric state variables of the PM machine.

According to the present invention, the deviations of the manipulated variables for the direct-axis current and the cross current which are available anyway are detected in an advantageous manner by associated parameters of the temperature model. These deviations are temperature-dependent and provide accurate information about the rotor temperature, even in the steady state of the controller.

In order to filter out transient system deviations, a time constant is taken into account in an advantageous manner within the scope of determining the rotor temperature, the time constant being of the magnitude of the thermal rotor time constant.

BRIEF DESCRIPTION OF THE DRAWING

The drawing shows a block diagram including circuit blocks for understanding the present invention.

DETAILED DESCRIPTION

The block diagram illustrated in the FIGURE shows a device for a field-oriented regulation of a permanent-magnet-excited synchronous machine 8.

In this regulation, phase currents ia, ib, ic, derived from the three-phase system of the PM machine, are converted in a Park transformer 13 into currents Id_actual and Iq_actual of a rectangular coordinate system. Current Id_actual represents the actual value for the direct-axis current of the machine. Current Iq_actual represents the actual value for the cross current of the machine.

Actual value Id_actual of the direct-axis current is supplied to a direct-axis current regulator 1 as an actual value; actual value Iq_actual is supplied to a cross current regulator 2 as an actual value.

The setpoint value input of direct-axis current regulator 1 receives a setpoint value signal which is determined from the output signal of a battery voltmeter 16 and the output signal of an absolute-value generator 10 by using a field weakening regulator 11 and a limiter 12. Field weakening regulator 11 has the function of influencing the setpoint value for direct-axis current regulator 1 as a function of the battery voltage measured and the output signal of the absolute-value generator. This field weakening of the PM synchronous machine is required at higher rotational speeds since the induced machine voltage would otherwise be greater than the maximum power converter output voltage. This voltage is limited by the present supply voltage which is the voltage of the vehicle electrical system.

A manipulated variable Id* for the direct-axis current is made available at the output of direct-axis current regulator 1. In a summing unit 3, this manipulated variable is superimposed by a pilot control component which is directly derived from the output of limiter 12. The output signal of summing unit 3 is supplied to an input of a stationary model 5 of the PM synchronous machine.

A setpoint value signal Iq_setpoint for the cross current is supplied to the setpoint value input of cross current regulator 2. This setpoint value signal is made available by a cross current setpoint generator 14 in which, by using an estimate for the rotor temperature TR, a setpoint torque or a setpoint value for the cross current is determined. In determining the setpoint value signal for the cross current, cross current setpoint value generator 14 furthermore takes into account selections or requirements of a higher-level control.

A manipulated variable Iq* for the cross current is made available at the output of cross current regulator 2. In a summing unit 4, a pilot control component which is directly derived from the output of cross current setpoint value generator 14 is superimposed on this manipulated variable. The output signal of summing unit 4 is supplied to an input of stationary model 5 of the PM synchronous machine.

A signal derived from a tachometer generator 9 and containing information about rotational speed n is supplied to stationary model 5 as an additional input signal.

Stationary model 5 is a model of the machine whose equivalent circuit diagram parameters at a reference temperature were determined in advance, and which are contained in a suitable manner in the software control algorithm of the stationary model. This control algorithm is designed in a way that, by taking into account the pilot control at reference temperature, the regulator output variables, i.e., manipulated variable Iq* for the cross current and manipulated variable Id* for the direct-axis current, are zero in the steady state. The occurrence of transient disturbances, which is the case, for example, at the occurrence of a sudden change of a reference variable and of a sudden disturbance change, results in output variables that are different from zero, which, however, quickly move back toward zero due to the control process.

Direct-axis component ud and cross component uq of the control voltage provided for the PM synchronous machine are output at separate outputs of stationary model 5. These control voltage components, which are control voltage components in the rectangular coordinate system, are supplied to an inverse Park transformer 6. This transformer's function is to convert control voltage components ud and uq, present in the rectangular coordinate system, into control voltage components ua, ub, and uc of the three-phase system. These are supplied to PM synchronous machine 8 via a pulse-controlled inverter 7.

Furthermore, signals ud for the direct-axis component of the control voltage and uq for the cross component of the control voltage output at the separate outputs of stationary model 5 are supplied to absolute-value generator 10 in which an absolute-value generation takes place according to the equation:

$$u = (ud^2 + uq^2)\exp(\tfrac{1}{2})$$

As described above, the output signal of absolute-value generator 10 is used as the input signal for field weakening controller 11.

Furthermore, direct-axis current manipulated value Id*, present at the output of direct-axis current controller 1, is fed to a first input of an estimator 15 via a line 11. Cross current manipulated variable Iq*, present at the output of cross current controller 2, is fed to a second input of estimator 15 via a line 12.

A temperature pattern of the synchronous machine is stored in the form of a characteristics map in estimator 15 which is preferably implemented as a microcomputer. In this characteristics map it is taken into account that, when the PM synchronous machine heats up, the resistance of the stator winding increases by approximately 40% per 100 K and the remanent flux density of the permanent magnets of the PM synchronous machine decreases by approximately 6% per 100 K. This temperature-dependent deviation of real machine parameters from the associated model parameters is used to determine the rotor temperature as monitoring. Also in the steady state, direct-axis current controller 1 and cross current controller 2 have a manipulated variable deviation which is a function of the rotor temperature.

The sensitivity of such a monitoring process is good, although the temperature dependency of the winding resistance of the stator winding is neglected and only the remanent flux density is taken into account as a temperature-dependent variable or as a state variable for determining the rotor temperature.

A time constant which has order of magnitude of the thermal rotor time constant is advantageously taken into account in determining the rotor temperature in estimator 15. This may take place in that a suitable PT1 element is placed upstream from the actual determination process. Transient system deviations caused by a sudden change in a reference variable or an interference variable are filtered out using this timer.

As explained above, the present invention relates to thermal monitoring of a PM synchronous machine which is easy to implement and in which the rotor temperature is determined online. This takes place by determining constant deviations of manipulated variables for the direct-axis current and the cross current from associated parameters of a temperature model of the PM synchronous machine. The manipulated variables for the direct-axis current and the cross current are generated by simple pilot controllers. The temperature dependency of the remanent flux density of the permanent magnets is used as the state variable in the temperature model of the PM synchronous machine.

After turning off the engine, the controller and the temperature monitor should remain in operation until the engine has cooled down, so that in the event of an engine restart accurate information about the rotor temperature is available.

LIST OF REFERENCE NUMBERS
1 direct-axis current controller
2 cross current controller
3 summing unit
4 summing unit
5 stationary model of the PM synchronous machine at reference temperature
6 inverse Park transformer 7 pulse-controlled inverter
8 PM synchronous machine
9 tachometer generator
10 absolute-value generator
11 field weakening controller
12 limiter
13 Park transformer
14 cross current setpoint value generator
15 estimator
16 battery voltage meter
ia, ib, ic phase currents from the three-phase system
ID_actual direct-axis current actual value
Iq_actual cross current actual value
Id_setpoint direct-axis current setpoint value
Iq_setpoint cross current setpoint value
Id* manipulated variable for the direct-axis current
Iq* manipulated variable for the cross current
n rotational speed
ua, ub, uc control voltages for the three-phase system
uB battery voltage
ud direct-axis component of the control voltage
uq cross component of the control voltage

What is claimed is:

1. A method for determining a rotor temperature in a permanent-magnet-excited synchronous machine in which field-oriented regulation takes place, comprising:
performing a regulation of a direct-axis current to obtain a first manipulated variable for the direct-axis current;
performing a regulation of a cross current to obtain a second manipulated variable for the cross current;
supplying the first manipulated variable and the second manipulated variable to an estimator that contains a temperature model of the synchronous machine; and
determining an estimate for the rotor temperature in the estimator using the temperature model of the synchronous machine and the first manipulated variable and the second manipulated variable.

2. The method as recited in claim 1, wherein:
in order to determine the estimate for the rotor temperature, deviations of the first manipulated variable and the second manipulated variable from associated parameters of the temperature model are detected.

3. The method as recited in claim 1, wherein:
the determining of the estimate for the rotor temperature takes place in the estimator by taking a time constant that corresponds to a thermal rotor time constant into account.

4. The method as recited in claim 1, wherein:
a temperature dependency of a permanent magnet of the synchronous machine is used in the temperature model as a state variable.

5. A device for determining a rotor temperature in a permanent-magnet-excited synchronous machine in which a field-oriented regulation takes place, comprising:
a direct-axis current controller that provides at an output thereof a first manipulated variable for a direct-axis current;
a cross current controller that provides at an output thereof a second manipulated variable; and
an estimator that stores a temperature model of the synchronous machine, wherein:
the estimator is connected to the output of the direct-axis current controller and to the output of the cross current controller, and
the estimator determines an estimate for the rotor temperature in accordance with the temperature model of the synchronous machine and the first manipulated variable and the second manipulated variable.

6. The device as recited in claim 5, wherein:
the estimator determines deviations of the first manipulated variable and the second manipulated variable from associated parameters of the temperature model.

7. The device as recited in claim 5, wherein:
the estimator includes a time element having a time constant corresponding to a rotor time constant.

8. The device as recited in claim 5, wherein:
the temperature model contains information about a temperature dependency of a permanent magnet of the synchronous machine as a state variable.

9. The device as recited in claim 5, further comprising:
a memory for storing the temperature model, wherein:
the temperature model includes a characteristics map.

10. The device as recited in claim 5, wherein:
the estimator includes a microcomputer.

* * * * *